United States Patent [19]

Vogt et al.

[11] 4,019,679
[45] Apr. 26, 1977

[54] THERMOSTATICALLY CONTROLLED HEATING ARRANGEMENT INCLUDING A HEAT PUMP

[75] Inventors: Alfred Vogt, Schaan, Liechtenstein; Herbert Bolter, Bludenz, Austria

[73] Assignee: Interliz Anstalt, Vaduz, Liechtenstein

[22] Filed: Dec. 15, 1975

[21] Appl. No.: 640,579

[30] Foreign Application Priority Data

Dec. 20, 1974 Austria .......................... 10244/74

[52] U.S. Cl. .............................. 237/2 B; 236/1 E; 236/91 F; 62/175; 62/238
[51] Int. Cl.² ...................................... G05D 23/00
[58] Field of Search ........... 237/2 B; 236/1 E, 91 F; 62/238, 175

[56] References Cited

UNITED STATES PATENTS 2,721,728  10/1955  Higgins ........................... 62/238 X Primary Examiner—Arnold Rosenthal
Attorney, Agent, or Firm—Hans Berman

[57] ABSTRACT

A heating arrangement, in which the circulating heat transfer medium for radiators is heated by condensation of a refrigerant in a heat pump, is controlled by relays in the energizing circuits of the several, independently driven pumping units of the compressor in the heat pump in response to the difference between the temperature of the atmosphere outside the heated area and the temperature of the circulating heat transfer medium to reduce the pumping energy consumed in response to the rising temperature of the heat transfer medium, and thereby to improve the efficiency of the heating arrangement.

8 Claims, 4 Drawing Figures

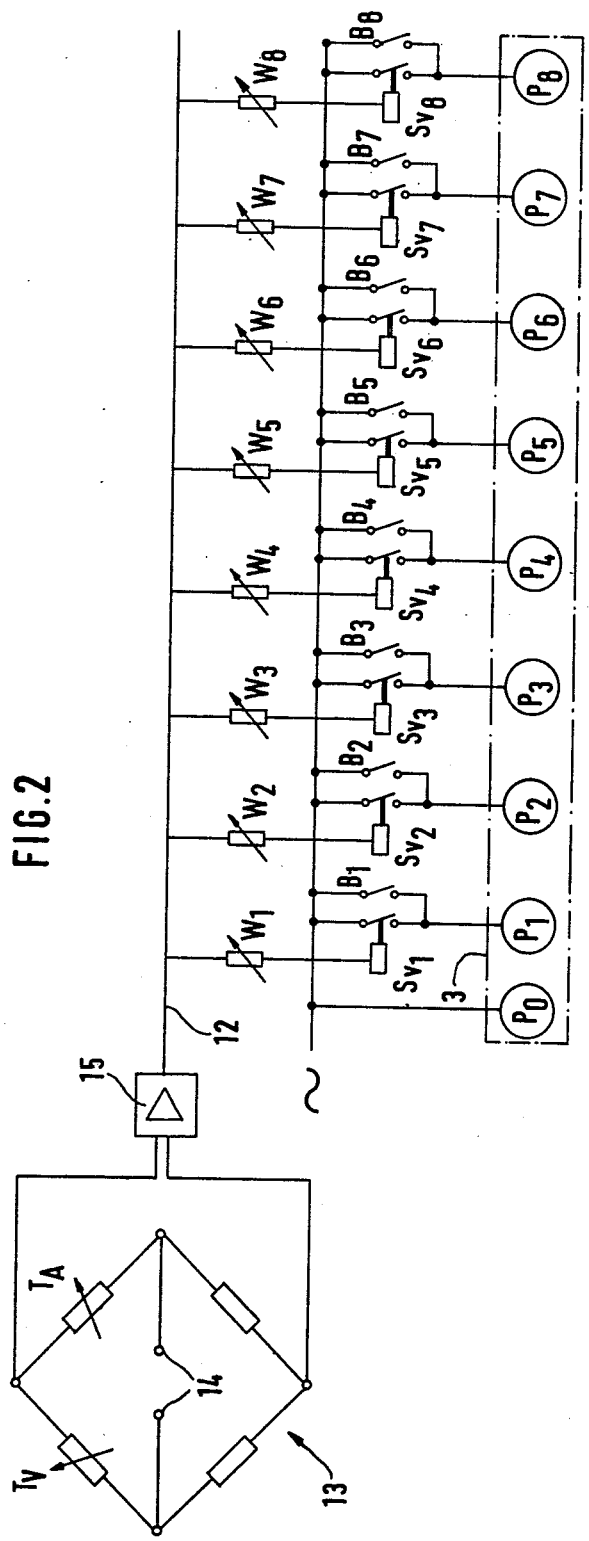
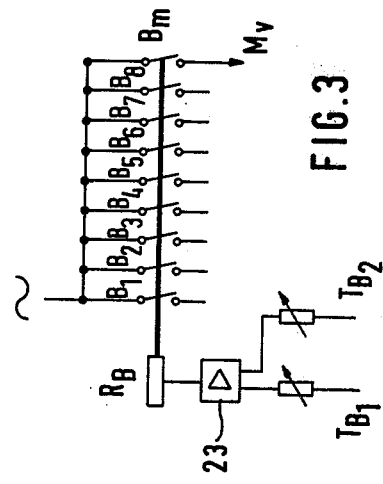
FIG.2
FIG.3

THERMOSTATICALLY CONTROLLED HEATING ARRANGEMENT INCLUDING A HEAT PUMP

This invention relates to heating arrangements, and particularly to a heating arrangement in which the thermal energy for heating an area is derived from a heat pump.

Heat pumps which draw thermal energy from a normally unused source, such as a body of surface or subsurface water or the atmosphere, at a lower temperature and transmit the energy to a heating medium at a higher temperature require an input of electrical or mechanical energy for operation in a Carnot cycle, and the efficiency of the heating arrangement is determined by the ratio of the thermal energy transmitted at the higher temperature to the mechanical or electrical energy input. It depends primarily on the difference between the input and output temperatures of the heat pump which should be as small as possible. The efficiency of known heating arrangements employing heat pumps is quite low, permitting heat pumps to be used relatively rarely despite their inherent and obvious advantages.

It is a primary object of this invention to improve the efficiency of such a heating arrangement.

With this object and others in view, as will hereinafter become apparent, the invention provides a heating arrangement in which the ambient outdoor temperature outside of the area to be heated and the temperature of the heating medium employed for heating the area are sensed. The compressor in the heat pump is composed of several, individually driven pumping units arranged in parallel between the evaporator and the condenser of the heat pump, and the number of driven pumping units in the compressor is increased and decreased in response to increases and decreases respectively in the difference of the sensed temperatures.

Other features, additional objects, and many of the attendant advantages of this invention will readily be appreciated as the same becomes better understood by reference to the following detailed description of preferred embodiments when considered in connection with the appended drawing in which:

FIG. 2 is a schematic of electrical circuits in the heating arrangement of FIG. 1;

FIG. 3 shows a further electrical circuit in the arrangement of FIG. 1; and

Figure 1:
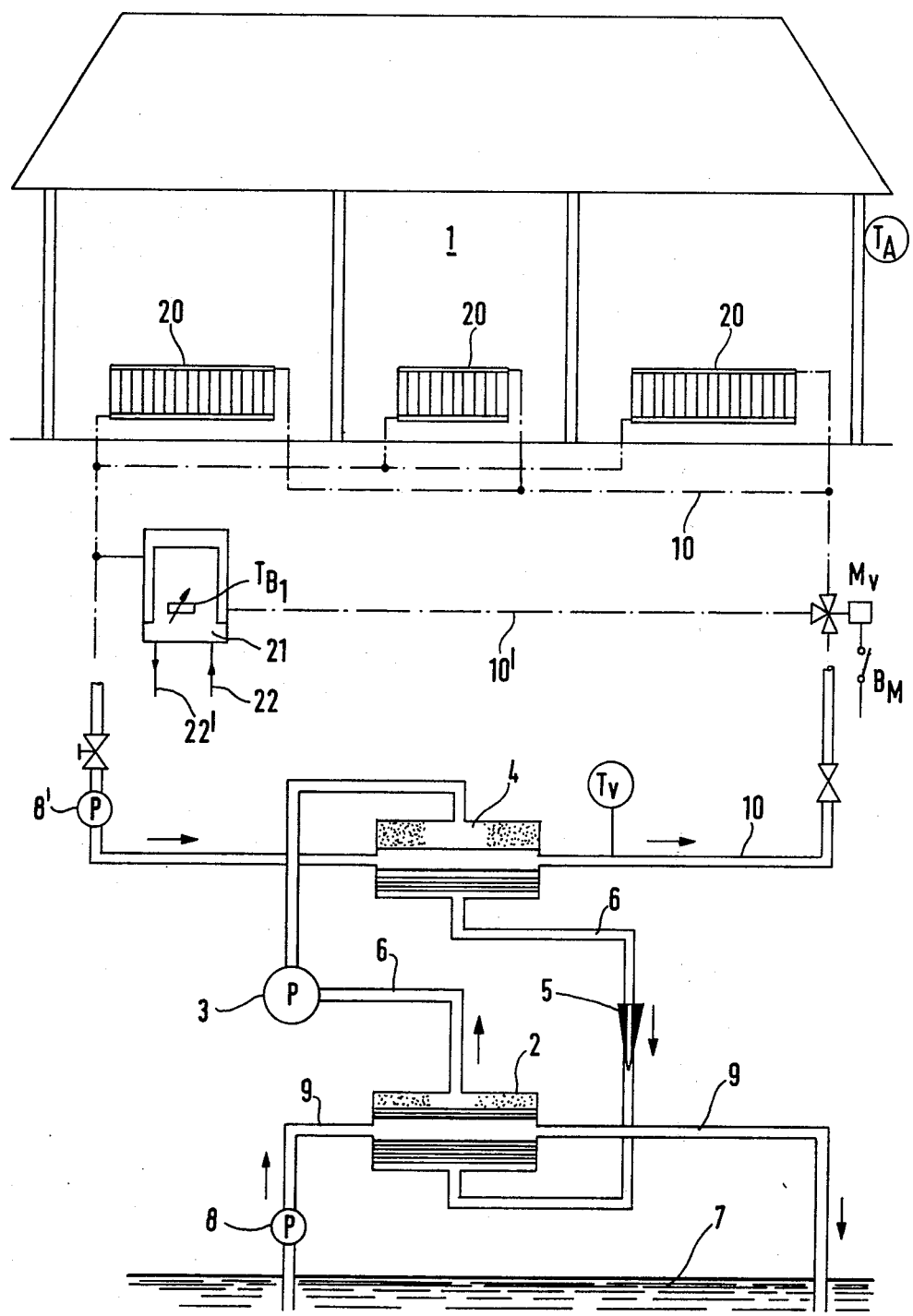
FIG. 1 shows a heating arrangement of the invention in an elevational view and partly by conventional symbols.

Referring now to the drawing in detail, and initially to FIG. 1, there is seen a house 1 heated by means of thermal energy drawn by a heat pump from a body of water 7 which may be a portion of the water table under the house 1.

The heat pump includes an evaporator 2 through which water from the water table is conveyed by a pump 8 and conduits 9. A low-boiling chlorofluorocarbon, conventional in mechanical refrigerators, is evaporated by indirect thermal contact with the groundwater in the evaporator 2. A compressor 3 draws the evaporated refrigerant from the evaporator 2 and drives the compressed and thereby heated, gaseous refrigerant into a condenser 4 in which it is liquefied by indirect thermal contact with water. The liquefied refrigerant is further cooled by adiabatic expansion in a nozzle 5 and returned to the evaporator 2 in a closed refrigerant circuit 6.

Water heated in the condenser 4 is driven by a circulating pump 8' through three radiators 20, arranged in parallel in respective areas of the house 1, and then returns to the condenser 4 in a heating circuit 10. The apparatus described so far is conventional in itself, and its operation is too well understood to require explanation. The overall efficiency of the heating arrangement is determined by the ratio between the thermal energy provided by the radiators 20 and the input of electrical energy for driving the pumps 8, 8' and the compressor 3.

Figure 4:
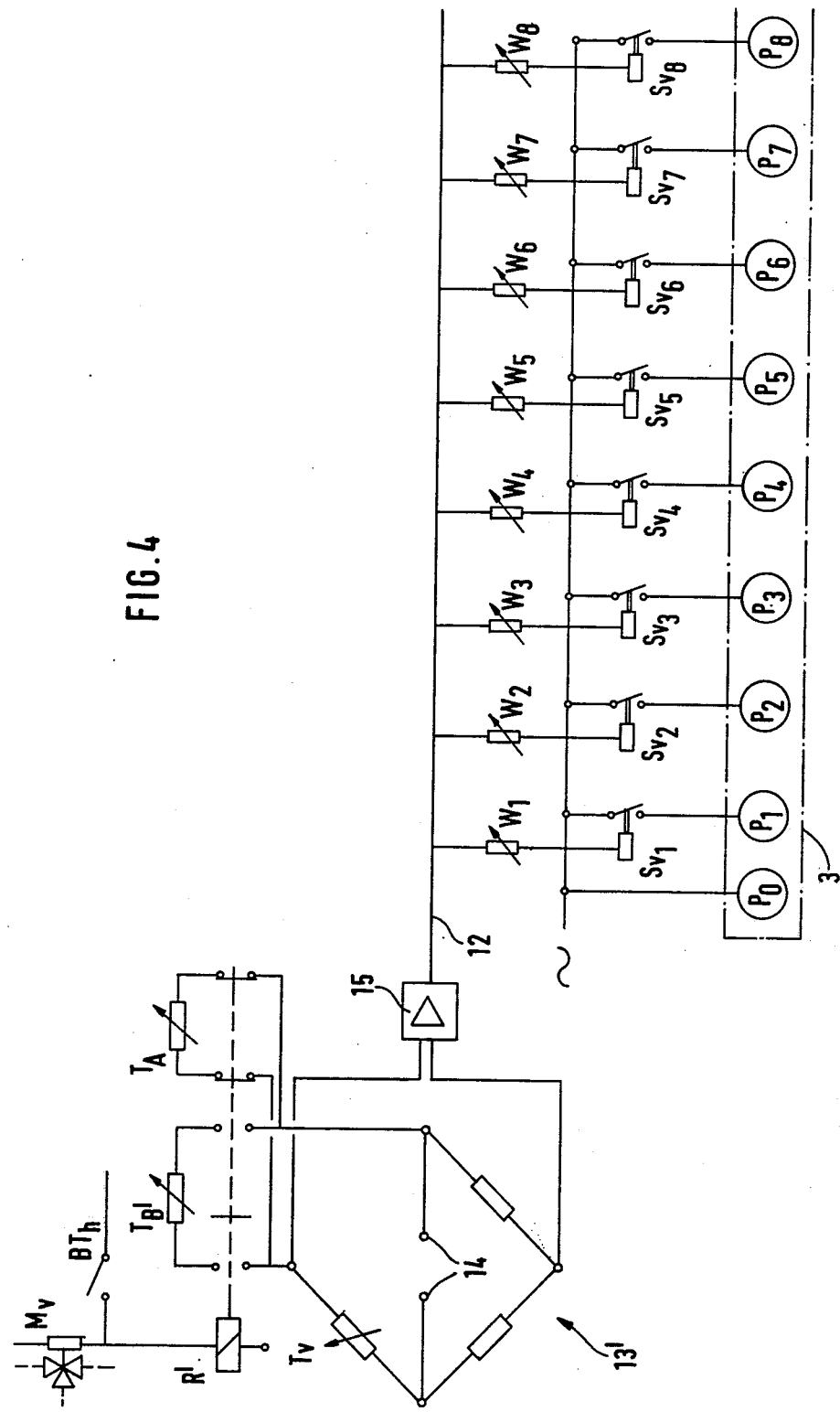
FIG. 4 shows modified circuitry for use in the heating arrangement of FIG. 1 in the manner of FIG. 2.

As is indicated in FIGS. 2 and 4, the compressor 3 according to the invention consists of nine individually driven pumping units $P_o$ to $P_8$ of which the units $P_1$ to $P_8$ are controlled according to the temperature of the water in the heating circuit 10 sensed at the water discharge of the condenser 4 by a thermoelectric sensor $Tv$ and according to the temperature prevailing outside the house 1 and sensed by another thermoelectric sensor $Ta$, the sensors being conventional in themselves.

Further according to the invention, a two-way valve $Mv$ is arranged in the heating circuit 10 and normally springbiased to direct the heated water from the condenser 4 to the radiators 20. When the solenoid actuator of the valve $Mv$ is energized by the closing of relay contacts $Bm$, the radiators 20 are by-passed in an auxiliary heating circuit 10' through the jacket of a heat exchanger 21. The core of the heat exchanger receives cold water through a pipe 22, and water heated by the diverted heating medium is discharged from the heat exchanger core through a hot-water pipe 22' leading to faucets in the house 1, not shown, but conventional. A thermoelectric sensor $Tb_1$ is provided in the core of the heat exchanger 21.

As is shown in FIG. 2, the thermoelectric sensors $Tv$, $Ta$ are arranged in respective branches of a bridge circuit 13, two terminals 14 of the bridge circuit being connected to a source of direct current, and the other two terminals being connected to the two inputs of a differential amplifier 15. The sensors $Tv$, $Ta$ thus generate temperature signals which are converted to an amplified difference signal and delivered by the amplifier 15 to an output line 12.

Eight relays $Sv_1$ to $Sv_8$ are connected to the output line 12 through respective, manually variable resistors $W_1$ to $W_8$. The normally open contacts of the relays are connected to a power line and to the respective drive motors in associated pumping units $P_1$ to $P_8$. An additional pumping unit $P_o$ of the compressor 3 is directly connected to the power line and independent of the difference signal generated by the amplifier 15. The resistors $W_1$ to $W_8$ are preferably adjusted in such a manner that the associated relays $Sv_1$ to $Sv_8$ respond to respective values of the difference signal from the amplifier 15 corresponding to uniformly spaced temperatures. Typically, only the pump $P_1$ may be energized when the air temperature outside the house 1, as sensed by the sensor $Ta$, is one degree below a desired temperature of 18° C while the temperature of the circulating water in the heating circuit 10 is at its full design value of 50° C for a difference of 32° C. If the difference between the two sensed temperatures rises to 33° C, the second pump $P_2$ is additionally energized, and all eight pumps are energized when the sensed temperatures differ by 39° C or more. As the temperature difference is reduced by additionally energized pumps, the last energized pump is deenergized when the corresponding threshold value of the difference signal is passed. The pump $P_o$ is energized at all times when the heating arrangement is in operation. It is controlled only by a non-illustrated main switch in the power line, and normally maintains the necessary pressure in the refrigerant circuit 6. means activating It is characteristic of this control system that the rate at which thermal energy is supplied is a direct function of the difference signal generated by the amplifier 15. As the heating arrangement approaches its desired condition, the rate of heat supply is gradually reduced by lowering the amount of refrigerant which is driven through the refrigerant circuit 6 and correspondingly reducing the temperature of the water in the heating circuit 10. The difference between the operating temperatures of the condenser 4 and the evaporator 2 is thus held at its lowest practical value at all times for improved efficiency of the heat pump.

The electrical circuit controlling the auxiliary heating circuit 10' is shown in FIG. 3. The sensor $Tb_1$ is arranged in a bridge circuit with a manually adjustable resistor $Tb_2$ calibrated in ° C. The bridge circuit only partly shown in FIG. 3 corresponds to the circuit 13 and feeds temperature signals to the two inputs of a differential amplifier 23 whose output is connected to the windings of a relay $R_B$. The normally open contacts $B_1$ to $B_8$ of the relay are connected in shunts across the contacts of the relays $Sv_1$ to $Sv_8$ between the power line and the pumps $P_1$ and $P_8$. The armature of the relay $R_B$ also carries the contacts $B_m$ in the energizing circuit of the valve Mv.

When the difference between the water temperature in the heat exchanger 21 and the temperature for which the resistor $Tb_2$ is set exceeds a certain value, the relay $R_B$ attracts its armature. Current from the power line to each of the pumps $P_1$ to $P_8$ bypasses the relays $Rv_1$ to $Rv_8$, and all pumps $P_1$ to $P_8$ are energized regardless of the water temperature in the heating circuit 10. Simultaneously, the valve Mv diverts the quickly heated water in the circuit 10 to the heat exchanger 10'. The hot water line 22' is supplied with hot water from the heat exchanger 21 whereupon the normal heating operation is resumed by the relay $R_B$ releasing its armature.

A circuit functionally equivalent to those to FIGS. 2 and 3 is shown in FIG. 4. It includes the differential amplifier 15 to whose output line 12 the relays $Sv_1$ to $Sv_8$ are connected by adjustable resistors $W_1$ to $W_8$ as described above to control the energizing of the pumps $P_1$ to $P_8$ by electrical energy from a power line. The modified bridge circuit 13' differs from the afore-described circuit 13 by the outdoor thermoelectric sensor Ta being normally connected in the circuit through movable contacts of a relay R' alternatively with a manually variable resistor $T_B'$ calibrated in units of °C. A thermostatic switch BTh is arranged in the common energizing line of the relay Mv and of the relay R' and is located in the jacket of the heat exchanger 21 (FIG. 1) in a manner not explicitly shown, but obvious from the above description of FIG. 3. No shunting contacts are required for by-passing the contacts of the relays $Sv_1$ to $Sv_8$.

When the temperature of the water in the jacket of the heat exchanger 21 drops below the value at which the switch TBh closes its contacts, the valve Mv is energized to disconnect the radiators 20 and to pass the heat transfer medium from the heating circuit 10 through the auxiliary circuit 10'. Simultaneously, the manually set resistor $T_B'$ replaces the outdoor temperature sensing device Ta in the bridge circuit 13', and all pumps $P_1$ to $P_8$ are energized regardless of the ambient temperature until the water temperature in the jacket reaches a temperature a few degrees higher than the desired temperature of the hot water supply. The normal heating conditions shown in FIG. 4 are restored when the relay R' releases its armature.

The invention has been described with reference to a hot-water heating system in the house 1, but it is equally applicable to other heating systems including those that supply hot air or steam to the several rooms of a house, and to heating systems employing any one of the afore-mentioned heat transfer media for heating an area other than that in a house, such as water in a swimming pool.

An electric control system has been shown and is preferred. However, the pneumatic or hydraulic analogs of the curcuits shown in FIGS. 2 to 4 will readily be constructed by those skilled in the art to perform in the same manner as described above. The illustrated mechanical relays $Sv_1$ to $Sv_8$ may be replaced by electronic switching gear in an obvious manner, and the manual adjustment of such switching gear to the several values of the difference signal generated by the amplifier 15 may be obtained by means other than the variable resistors $W_1$ to $W_8$. It is preferred that the response temperatures of sequentially energized relays $Sv_1$ to $Sv_8$ be separated by equal numbers of degrees C, but other response characteristics are readily set on the resistors $W_1$ to $W_8$ when prevailing conditions warrant such a modification.

It should be understood, therefore, that the foregoing disclosure relates only to preferred embodiments of the invention, and that it is intended to cover all changes and modifications of the examples of the invention herein chosen for the purpose of the disclosure which do not depart from the spirit and scope of the invention set forth in the appended claims.

What is claimed is:

1. A heating arrangement comprising:
  a. a heat pump including
    1. a condenser,
    2. an expansion nozzle,
    3. an evaporator, and
    4. compressor means for compressing and thereby liquefying a volatile first heat transfer medium, for sequentially driving said medium through said condenser, said expansion nozzle, and said evaporator, and for receiving the medium evaporated in said evaporator,
      i. said compressor means including a plurality of individually driven pumping units connected in parallel between said evaporator and said condenser;
  b. a heating circuit including
    1. heater means for heating an area,
    2. circulating means for circulating a second heat transfer medium through said condenser and said heater means for heat transfer between said first heat transfer medium and said area,
    3. first temperature sensing means for sensing the ambient outdoor temperature outside of said area, and
    4. second temperature sensing means for sensing the temperature of said second heat transfer medium circulated by said circulating means; and c. control means operatively connected to said first and second temperature sensing means and to said compressor means for increasing and decreasing the number of driven pumping units in said compressor means in response to increases and decreases respectively in the difference of the temperatures respectively sensed by said first and second temperature sensing means.

2. An arrangement as set forth in claim 1, wherein said first and second temperature sensing means generate respective temperature signals in response to the sensed temperatures, said control means including difference signal generating means connected to said first and second temperature sensing means for generating a difference signal in response to the difference between said temperature signals, and relay means associated with each pumping unit for energizing the same, said relay means being connected to said difference signal generating means for energizing the associated pumping units in response to different respective values of said difference signals.

3. An arrangement as set forth in claim 2, wherein said relay means include at least three relay units respectively responding to a first, a second, and a third value of said difference signal for energizing the respective associated pumping units, the difference between said first and second values being equal to the difference between said second and third values.

4. An arrangement as set forth in claim 2, wherein said relay means include a plurality of relay units associated with respective pumping units, each relay unit including manually operable means for varying the value of said difference signal to which said relay unit responds by energizing the associated pumping unit.

5. An arrangement as set forth in claim 2, further comprising a source of electric energy, said compressor means including an additional, electrically driven pumping unit connected in parallel with said individually driven pumping units between said evaporator and said condenser, and conductive means for drivingly connecting said additional pumping unit to said source independently of said difference signal.

6. An arrangement as set forth in claim 2, wherein said temperature signals and said difference signal are electrical signals, said pumping units being electrically driven.

7. An arrangement as set forth in claim 6, further comprising auxiliary heating apparatus including a heat exchanger, valve means in said heating circuit operable for disconnecting said heater means from said condenser and for connecting said heat exchanger to said condenser for circulation of said second heat transfer medium through said heat exchanger, and for transfer of thermal energy in said heat exchanger from said second heat transfer medium to a liquid to be heated, and control means for operating said valve means.

8. An arrangement as set forth in claim 7, further comprising shunting means associated with each of said pumping units for energizing the same independently of the value of said difference signal when said shunting means is activated, said control means including means for activating said shunting means simultaneously with the operating of said valve means.

* * * * *